(12) United States Patent
Marles

(10) Patent No.: US 10,364,832 B2
(45) Date of Patent: Jul. 30, 2019

(54) ACTUATOR

(71) Applicant: AIRBUS OPERATIONS LIMITED, Bristol (GB)

(72) Inventor: David Marles, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 223 days.

(21) Appl. No.: 15/165,429

(22) Filed: May 26, 2016

(65) Prior Publication Data

US 2016/0348701 A1   Dec. 1, 2016

(30) Foreign Application Priority Data

May 27, 2015 (GB) .................................. 1509049.1

(51) Int. Cl.
*F15B 21/06* (2006.01)
*F15B 15/22* (2006.01)
*B64C 25/22* (2006.01)
*B64C 25/24* (2006.01)

(52) U.S. Cl.
CPC .............. *F15B 15/22* (2013.01); *B64C 25/22* (2013.01); *B64C 25/24* (2013.01); *F15B 21/065* (2013.01)

(58) Field of Classification Search
CPC .................................................... F15B 21/065
See application file for complete search history.

(56) References Cited

U.S. PATENT DOCUMENTS

| 2,692,582 A * | 10/1954 | Curci .................... F15B 13/044 137/251.1 |
| 2,846,028 A * | 8/1958 | Gunther .................. F16F 9/535 188/267.2 |
| 6,302,249 B1 * | 10/2001 | Jolly ...................... F15B 11/076 188/269 |
| 6,352,143 B1 | 3/2002 | Niaura et al. |
| 6,471,018 B1 * | 10/2002 | Gordaninejad ......... F16F 9/535 188/267.1 |
| 2001/0048049 A1 | 12/2001 | Carter, Jr. |
| 2014/0299801 A1 * | 10/2014 | Alred .................. E21B 33/0355 251/62 |

FOREIGN PATENT DOCUMENTS

GB   2362699 A   11/2001

* cited by examiner

*Primary Examiner* — F Daniel Lopez
(74) *Attorney, Agent, or Firm* — Nixon & Vanderhye P.C.

(57) ABSTRACT

The present invention provides an actuator comprising an actuator body, a piston relatively moveable within the actuator body, and a rod attached to the piston and extending out of the actuator body, the actuator body comprising a port for conveying actuator fluid, wherein the actuator also has a damping control portion provided with damping control fluid containing magnetic particles, wherein the piston or the rod is adjacent the damping control fluid, and a first electrical coil associated with the damping control portion, such that an electrical current supplied to the first electrical coil induces a magnetic field and causes the effective viscosity of the damping control fluid to increase, thus increasing the damping effect of the damping control fluid on the piston or rod. The invention also provides an aircraft assembly, such as a landing gear assembly, an aircraft and a method of operating an actuator.

8 Claims, 3 Drawing Sheets

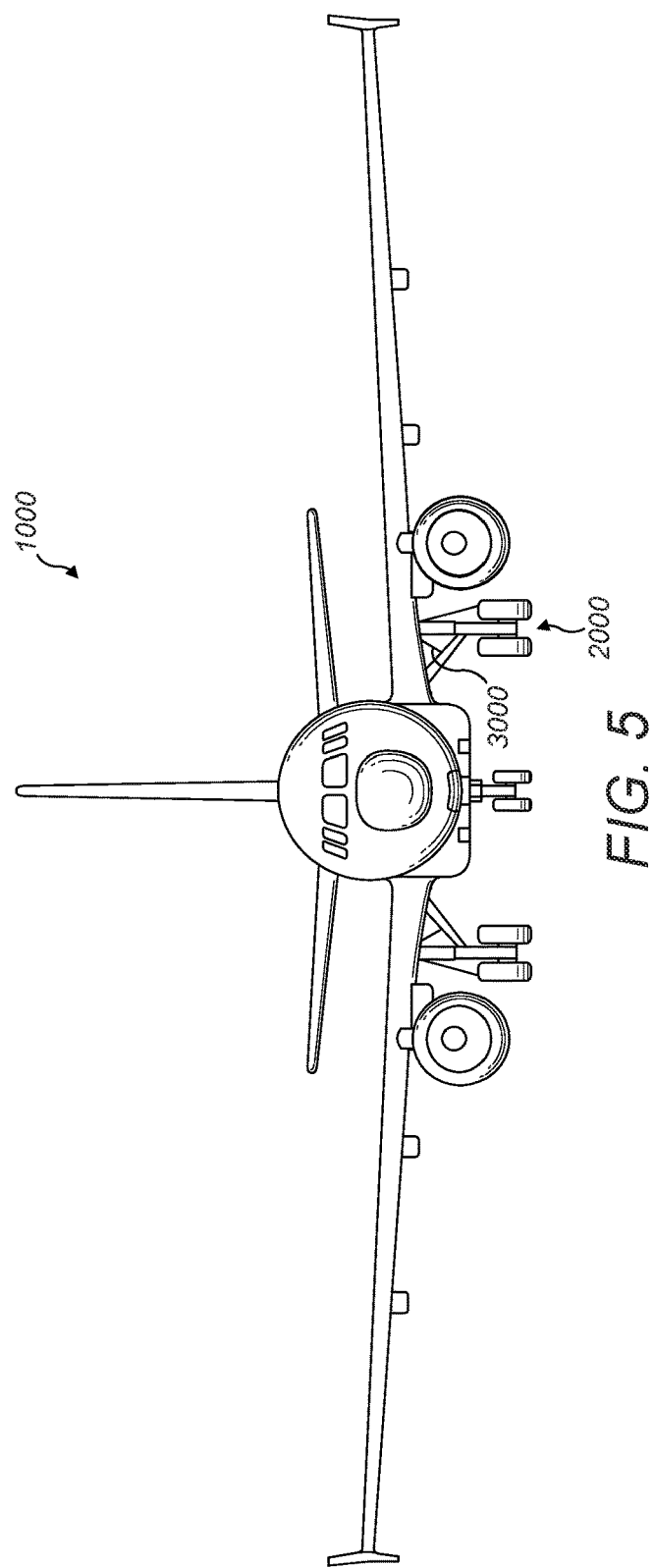

ACTUATOR

RELATED APPLICATIONS

The present application claims priority from Great Britain Application Number 1509049.1, filed May 27, 2015, the disclosure of which is hereby incorporated by reference herein in its entirety.

BACKGROUND OF THE INVENTION

The present disclosure relates to an actuator.

The present invention concerns an actuator. More particularly, but not exclusively, this invention concerns an actuator comprising an actuator body, a piston moveable within the actuator body, and a rod attached to the piston and extending out of a first end of the actuator body, the actuator body comprising a port for conveying actuator fluid to or from the actuator body to effect movement of the piston and rod.

The invention also concerns an aircraft assembly, such as a landing gear assembly, comprising the actuator, an aircraft comprising the actuator and a method of operating an actuator.

Prior art actuators, for example actuators to effect movement of landing gear doors on an aircraft, often suffer from dynamic load peaks, such as when the piston of the actuator reaches the end of its travel in an actuator body or because of hydraulic peaks due to valve switching, dynamically generated loads or a hydraulically generated feature during actuator travel. The load peaks may occur when there is acceleration or deceleration of the piston. These load peaks can cause fatigue effects on both the actuator and surrounding attachment structure. This requires that the actuator and structure are designed to allow for these effects and may be bigger or heavier than otherwise required.

To overcome these problems, many actuators are provided with snubbing rings to reduce the load peaks at the end of piston travel. These snubbing rings, or other snubbing devices, restrict the flow of fluid in or out of an actuator, which minimises piston acceleration/deceleration at the end of travel. However, the response of the actuator can be detrimentally affected by the use of snubbing devices. In addition, the snubbing devices offer limited flexibility for design alterations and are not readily able to "fade" in or out—in other words, there are essentially either "on" or "off" and have limited or no "ramping" up/down capability. They also have a fixed performance and cannot easily be altered for different operating conditions (e.g. aircraft speed, fluid temperature etc.). Furthermore, failure in a mechanical snubbing device can be difficult to detect, so that failure exposes the actuator and airframe structure to high loads. The actuator and structure have to be designed to allow for these high loads after snubbing device failure.

The present invention seeks to mitigate the above-mentioned problems. Alternatively or additionally, the present invention seeks to provide an improved actuator.

SUMMARY OF THE INVENTION

The present invention provides, according to a first aspect, an actuator comprising an actuator body, a piston relatively moveable within the actuator body, and a rod attached to the piston and extending out of a first end of the actuator body, the actuator body comprising a port for conveying actuator fluid to or from the actuator body to effect relative movement of the piston and rod with respect to the actuator body, wherein the actuator also has a damping control portion provided with damping control fluid containing magnetic particles, wherein the piston or the rod is adjacent the damping control fluid, and a first electrical coil associated with the damping control portion, such that an electrical current supplied to the first electrical coil induces a magnetic field over the damping control fluid and causes the effective viscosity of the damping control fluid to increase, thus increasing the damping effect of the damping control fluid on the piston or rod.

The actuator may comprise a pump associated with the actuator body for conveying fluid to or from the actuator body. The pump may be associated with an inlet or outlet port passage of the actuator body for conveying fluid through the port passage(s).

The damping control fluid may be a magnetorheological fluid. It may also be a ferrofluid (with smaller magnetic particles).

Such an actuator with such a damping control fluid offers a simple, cheap and lightweight alternative to an actuator with a snubbing device. In addition, it enables greater speed control of the piston and greater design flexibility. There is also reduced risk of mechanical failure (compared to, for example, snubbing devices) and greater potential for damping failure modes of the system before they propagate. There is also greater potential for failure detection. In addition, the actuator itself and the surrounding attachment airframe structure can be lighter as less fatigue and lower loads may be experienced. In addition, there are no moving parts in the damping mechanism, making the actuator more reliable. Furthermore, the damping can be controlled so as to overcome any temperature effects that change the viscosity and pressure differences of the actuator fluid during use. For example, when it is cooler, the actuator fluid naturally damps movement of the piston more, hence, in cooler temperatures, less current than otherwise would have been, could be supplied to the first electrical coil, to reduce the damping effect.

Previously, such damping control fluid has only been used in relation to dampers (closed volume systems) and not with actuators (open volume systems).

Preferably, the damping control portion comprises a chamber located past the first end of the actuator body and wherein the rod extends through the first end of the actuator body and (is connected to a mechanism that extends) into a first end of the chamber, such that the damping control fluid in the chamber is adjacent to the rod (or mechanism) and wherein an increase in viscosity of the damping control fluid increases the damping effect of the damping control fluid on relative movement of the rod through the chamber.

In this arrangement, the damping control fluid damps movement of the actuator piston by increasing the friction the actuator rod experiences as it moves relatively through the damping control fluid.

The chamber may be fitted to an end of an existing actuator body for a retrofit option.

More preferably, the rod extends out of a second opposite end of the chamber.

Preferably, the first electrical coil extends around the chamber. Preferably, the first electrical coil extends around an extension of the rod axis.

Alternatively, the damping control portion may be part of an inlet or outlet port passage of the actuator body and wherein the actuator fluid contains magnetic particles and thus provides the damping control fluid and wherein an increase in viscosity of the actuator fluid increases the damping effect of the actuator fluid on the relative movement of the piston in the actuator body.

In this arrangement, the damping control fluid damps movement of the actuator piston by reducing the flow-rate of actuator fluid through the port passage (effectively reducing the orifice size of the port passage), increasing the pressure drop across the port passage and increasing the time it takes for actuator fluid to pass through the port passage, thus slowing movement of the piston through the actuator body.

Preferably, the first electrical coil extends around the inlet or outlet port passage of the actuator body.

The actuator body may have two (or more) ports and an electrical coil may extend around each of the port passages.

Preferably, the actuator also has a controller unit for controlling the electrical current supplied to the first electrical coil.

More preferably, the controller unit is provided with an input related to the relative position and/or speed of the piston within the actuator body.

The controller unit can supply the required electrical current to the first electrical coil to damp relative movement of the piston, based on the relative position and/or speed of the piston within the actuator body. For example, a current may be supplied to the first electrical coil when the piston approaches either end of the actuator body.

Alternatively, the piston or rod may be provided with a magnet and an inducer coil is provided around the actuator body, such that relative movement of the piston or rod within the actuator body induces an electrical current in the inducer coil.

For example, the faster the piston or rod moves, the more electrical current induced. This is because current induced is proportional to the rate of "cutting" of magnetic flux lines.

Alternatively, the actuator body may be provided with a magnet and the piston or rod provided with an inducer coil such that relative movement of the piston or rod within the actuator body induces an electrical current in the inducer coil.

The magnet may be a permanent magnet or an electromagnet.

Preferably, the electrical current supplied to the first electrical coil is dependent on the electrical current induced in the inducer coil. More preferably, the induced electrical current (in the inducer coil) is supplied to the first electrical coil. The two coils may be electrically connected by a resistor, for example.

There may be provided more than one inducer coil. The inducer coils may have a different number of windings or a different density of windings. This allows the damping effect to be increased for relative piston movement in specific areas of the actuator body. For example, towards the end of piston travel in the actuator body, the windings may be provided more densely. This would induce more current for the same relative movement of the piston, compared to a more central position of the piston in the actuator body.

Preferably, the actuator has a plurality of electrical coils associated with the damping control portion. The coils may have a different number of windings or density of windings.

The actuator may have an actuator fluid pressure of approximately 3000 to 5000 psi.

The present invention provides, according to a second aspect, an aircraft assembly, such as a landing gear assembly, comprising the actuator as described above. For example, the actuator may be an actuator for opening landing gear doors in a landing gear assembly. The actuator may actuate movement of the landing gear itself. The actuator may actuate movement of an aircraft control surface. The actuator may be used to damp oscillations of the control surface.

The present invention provides, according to a third aspect, an aircraft comprising the actuator as described above.

The present invention provides, according to a fourth aspect, a method of operating the actuator as described above, wherein the method comprises the steps of conveying actuator fluid to or from the actuator body to effect relative movement of the piston and rod, and damping such movement by supplying an electrical current to the first electrical coil.

Preferably, the electrical current supplied to the first electrical coil is based on a current induced in an inducer coil, the current induced in the inducer coil being related to the position and/or speed of relative movement of the piston or rod.

Preferably, the actuator is part of an aircraft or aircraft assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 5 shows an aircraft provided with an actuator, according to any of the first to fourth embodiments.

DETAILED DESCRIPTION

Figure 1:
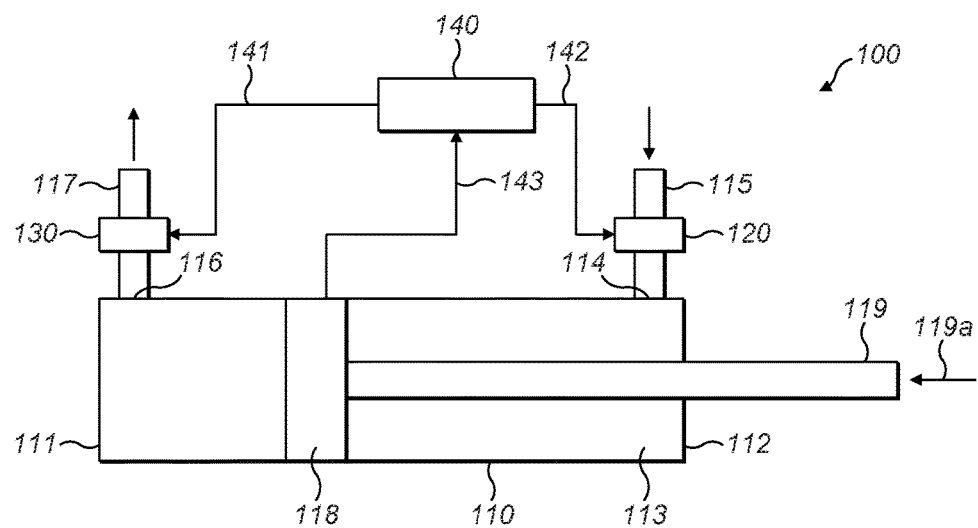
FIG. 1 shows a schematic side view of an actuator according to a first embodiment of the invention.

FIG. 1 shows a schematic side view of an actuator 100 according to a first embodiment of the invention.

The actuator 100 comprises an actuator body 110 with a left hand end 111 and a right hand end 112. The actuator is provided with a first inlet/outlet port 114 and first port passage 115 towards the right hand end 112, and a second inlet/outlet port 116 and second port passage 117 towards the left hand end 111. Actuator fluid 113 is fed in and from the actuator body 110 via these ports 114, 116.

A piston 118 is located within the actuator body and is attached to a rod 119 extending out of the right hand end 112 of the actuator body. The rod 119 is able to move in and out of the actuator body 110. Arrow 119a, for example, shows the rod 119 moving into the actuator body 110, as a result of actuator fluid 113 being fed into port 114 and fed out of port 116. The piston 118 (and rod 119) move relative to the actuator body 110 as a result of the actuator fluid 113 fed in and out of ports 114, 116.

A first electrical coil 120 is provided around the first port passage 115 and a similar second electrical coil 130 is provided around the second port passage 117. The first coil 120 is supplied with electricity from a control unit 140 via a first electrical line 142. The second coil 130 is supplied with electricity from the control unit 140 via a second electrical line 141.

The actuator fluid 113 contains magnetic particles. Hence, when electricity is supplied by the control unit 140 to either first coil 120 or second coil 130, a magnetic field is produced around the first or second port passage 115 or 117. This increases the viscosity of the actuator fluid 113 in that vicinity and slows movement of the fluid through the port passage 115 or 117. This damps movement of the piston 118 in the actuator body 110, and therefore movement of the rod 119.

The control unit 140 is connected to the piston 118 such that a signal is sent through an electrical piston line 143 to the control unit 140 to indicate the position of the piston 118 within the actuator body 110. The control unit 140 controls the electricity supplied to the first and/or second coil 120/130 based on this indication of the position of the piston 118. For example, if the piston 118 is nearing the left hand end 111 of the actuator body 110, the control unit 140 may supply electricity to second coil 130 to slow down the movement of the piston 118 in that direction. This is active control.

In the embodiment of FIG. 1, the claimed "damping control portion(s)" comprise the areas of the port passages 115, 117 that are associated with the electrical coils 120, 130.

Figure 2:
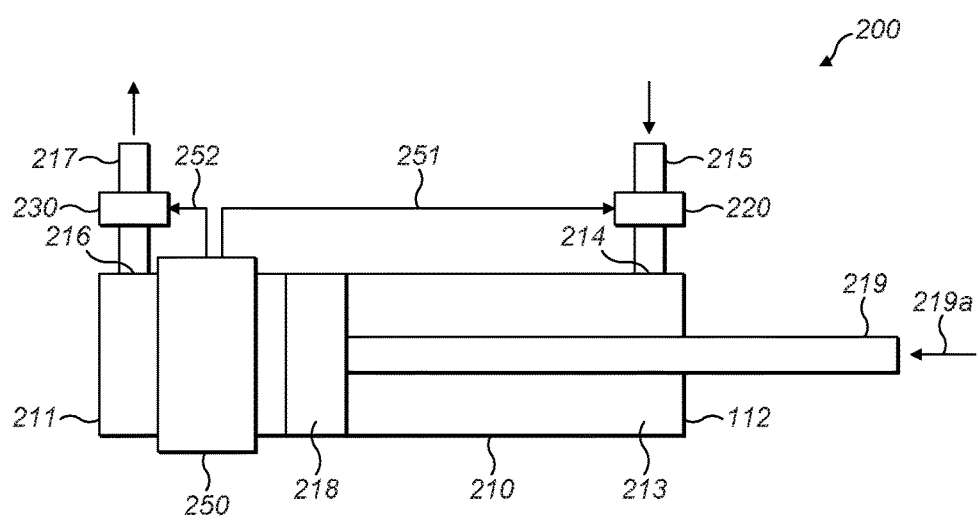
FIG. 2 shows a schematic side view of an actuator according to a second embodiment of the invention.

FIG. 2 shows a schematic side view of an actuator 200 according to a second embodiment of the invention. The actuator 200 is similar to the actuator 100 of FIG. 1, and the same reference numerals will be used for like elements, but prefixed by a "2" instead of a "1".

The actuator 200 comprises an actuator body 210 with a left hand end 211 and a right hand end 212. The actuator is provided with a first inlet/outlet port 214 and first port passage 215 towards the right hand end 212, and a second inlet/outlet port 216 and second port passage 2117 towards the left hand end 211. Actuator fluid 213 is fed in and from the actuator body 210 via these ports 214, 216.

A piston 218 is located within the actuator body and is attached to a rod 219 extending out of the right hand end 212 of the actuator body. The rod 219 is able to move in and out of the actuator body 210. Arrow 219a, for example, shows the rod 219 moving into the actuator body 210, as a result of actuator fluid 213 being fed into port 214 and fed out of port 216. The piston 218 (and rod 219) move relative to the actuator body 210 as a result of the actuator fluid 213 fed in and out of ports 214, 216. The piston 218 includes a magnet within it.

A first electrical coil 220 is provided around the first port passage 215 and a similar second electrical coil 230 is provided around the second port passage 217. The first electrical coil 220 is supplied with electricity via a first electrical line 251. The second electrical coil 230 is supplied with electricity via a second electrical line 252.

The actuator fluid 213 contains magnetic particles. Hence, when electricity is supplied to either first electrical coil 220 or second electrical coil 230, a magnetic field is produced around the first or second port passage 215 or 217. This increases the viscosity of the actuator fluid 213 in that vicinity and slows movement of the fluid through the port passage 215 or 217. This damps movement piston 218 in the actuator body 210 and therefore movement of the rod 219.

There is also provided an inducer coil 250 around the actuator body 210 towards the left hand end of the actuator body 210. When the piston (and the magnet inside it) moves through the inducer coil 250, electricity is induced in the inducer coil. The inducer coil 250 is connected to the first electrical line 251 and the second electrical line 252. So, the induced electricity is supplied to the first electrical coil 220 and second electrical coil 230. This allows the amount of electricity supplied to the first and second electrical coils 220, 230 to be passively controlled based on the position of the piston 218 in the actuator body 210 and/or the speed of movement of the piston 218 through the inducer coil 250.

In the embodiment of FIG. 2, the claimed "damping control portion(s)" comprise the areas of the port passages 215, 217 that are associated with the electrical coils 220, 230.

Figure 3:
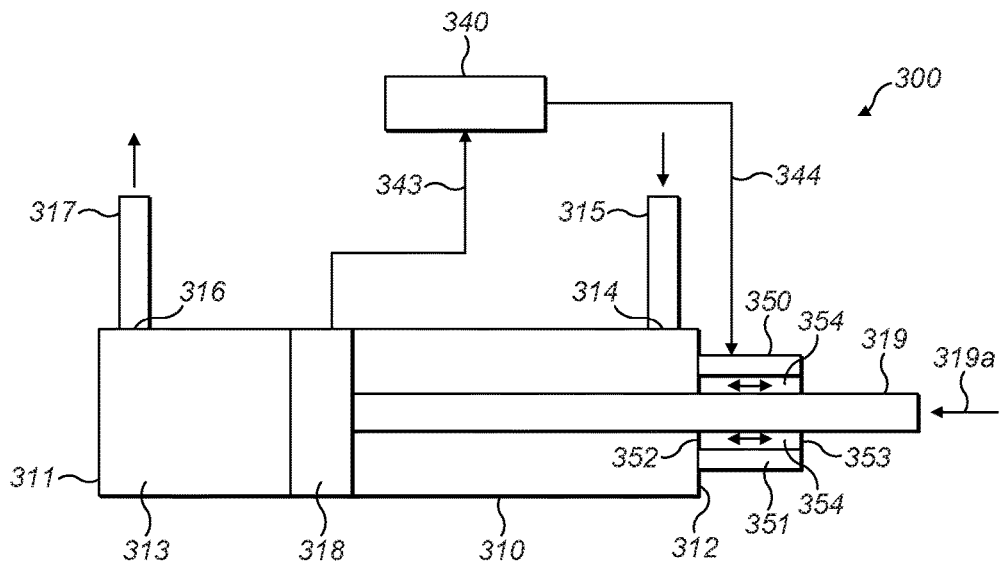
FIG. 3 shows a schematic side view of an actuator according to a third embodiment of the invention.

FIG. 3 shows a schematic side view of an actuator 300 according to a third embodiment of the invention. The actuator 300 is similar to the actuator 100 of FIG. 1, and the same reference numerals will be used for like elements, but prefixed by a "3" instead of a "1".

The actuator 300 comprises an actuator body 310 with a left hand end 311 and a right hand end 312. The actuator is provided with an first inlet/outlet port 314 and first port passage 315 towards the right hand end 312, and a second inlet/outlet port 316 and second port passage 317 towards the left hand end 311. Actuator fluid 313 (not containing magnetic particles—i.e. a traditional actuator fluid) is fed in and from the actuator body 310 via these ports 314, 316.

A piston 318 is located within the actuator body and is attached to a rod 319 extending out of the right hand end 312 of the actuator body. The rod 319 is able to move in and out of the actuator body 310. Arrow 319a, for example, shows the rod 319 moving into the actuator body 310, as a result of actuator fluid 313 being fed into port 314 and fed out of port 316. The piston 318 (and rod 319) move relative to the actuator body 310 as a result of the actuator fluid 313 fed in and out of ports 314, 316.

A chamber 350 is provided at the right hand end 312 of the actuator body 310 so that its left hand end 352 abuts against the right hand end 312 of the actuator body 310. The chamber 350 comprises walls but is open ended to allow the rod 319 to extend through the left hand end 352 and out the right hand end 353. Contained within the walls is a chamber fluid 354 containing magnetic particles. The rod 319 extends through the chamber fluid 354. An electrical coil 351 extends around the body of the chamber 350.

The electrical coil 351 is supplied with electricity from a control unit 340 via an electrical line 344.

As the fluid 354 contains magnetic particles, when electricity is supplied by control unit 340 to the electrical coil 351, a magnetic field is produced over the chamber fluid 354. This increases the viscosity of the chamber fluid 354 and slows movement of the rod 319 through the chamber 350. This slows movement of the piston 318 through the actuator body 310.

The control unit 340 is connected to the piston 318 such that a signal is sent through an electrical piston line 343 to the control unit 340 to indicate the position of the piston 318 within the actuator body 310. The control unit 340 controls the electricity supplied to electrical coil 351 based on the position of the piston 318. For example, if the piston 318 is nearing either end 311, 312 of the actuator body 310, the unit 340 may supply electricity to the electrical coil 351 to slow down the movement of the rod 319 and piston 318. This is active control.

In the embodiment of FIG. 3, the claimed "damping control portion" comprises the chamber 350.

Figure 4:
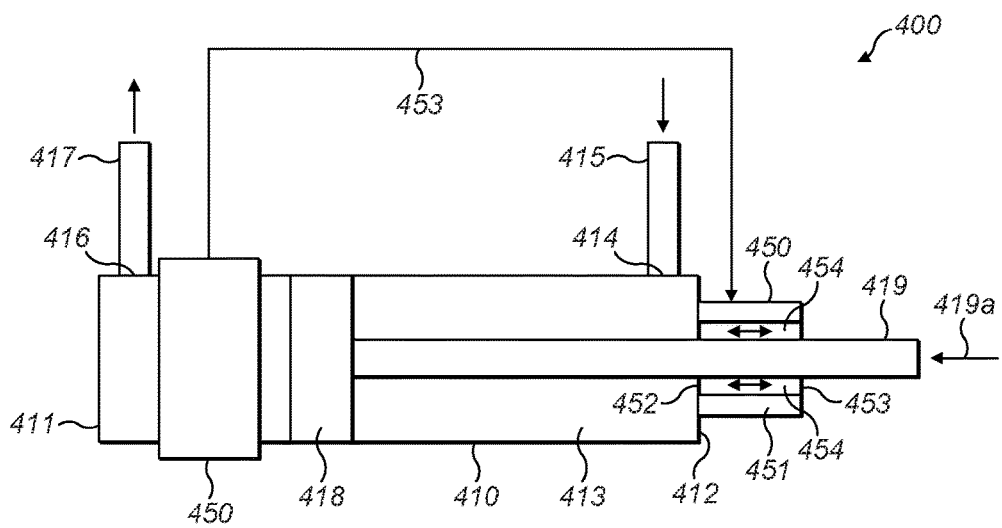
FIG. 4 shows a schematic side view of an actuator according to a fourth embodiment of the invention.

FIG. 4 shows a schematic side view of an actuator 400 according to a fourth embodiment of the invention. The actuator 400 is similar to the actuator 200 of FIG. 2 and the actuator 300 of FIG. 3, and the same reference numerals will be used for like elements, but prefixed by a "4" instead of a "2" or "3".

The actuator 400 comprises an actuator body 410 with a left hand end 411 and a right hand end 412. The actuator is provided with a first inlet/outlet port 414 and first port passage 415 towards the right hand end 412, and a second inlet/outlet port 416 and second port passage 417 towards the left hand end 411. Actuator fluid 413 (not containing magnetic particles—i.e. a traditional actuator fluid) is fed in and from the actuator body 410 via these ports 414, 416.

A piston 418 is located within the actuator body and is attached to a rod 419 extending out of the right hand end 412 of the actuator body. The rod 419 is able to move in and out of the actuator body 410. Arrow 419a, for example, shows the rod 419 moving into the actuator body 410, as a result of actuator fluid 413 being fed into port 414 and fed out of port 416. The piston 418 (and rod 419) move relative to the actuator body 410 as a result of the actuator fluid 413 fed in and out of ports 414, 416. The piston 418 includes a magnet within it.

A chamber 450 is provided at the right hand end 412 of the actuator body 410 so that its left hand end 452 abuts against the right hand end 412 of the actuator body 410. The chamber 450 comprises walls but is open ended to allow the rod 419 to extend through the left hand end 452 and out the right hand end 453. Contained within the walls is a chamber fluid 454 containing magnetic particles. The rod 419 extends through the chamber fluid 454. An electrical coil 451 extends around the body of the chamber 450.

The electrical coil 451 is supplied with electricity via an electrical line 453.

As the fluid 454 contains magnetic particles, when electricity is supplied to the electrical coil 451, a magnetic field is produced over the chamber fluid 454. This increases the viscosity of the chamber fluid 454 and slows movement of the rod 419 through the chamber 450. This slows movement of the piston 418 through the actuator body 410.

There is also provided an inducer coil 450 around the actuator body 410 towards the left hand end of the actuator body 410. When the piston (and the magnet inside it) moves through the inducer coil 450, electricity is induced in the inducer coil. The inducer coil 450 is connected to the electrical line 453. So, the induced electricity is supplied to the electrical coil 451. This allows the amount of electricity supplied to the electrical coil 451 to be passively controlled based on the position of the piston 418 in the actuator body 410 and/or the speed of movement of the piston 418 through the inducer coil 450.

In the embodiment of FIG. 4, the claimed "damping control portion" comprises the chamber 450.

FIG. 5 shows an aircraft 1000 provided with an actuator 3000. The actuator 3000 is provided on a landing gear assembly 2000 of the aircraft 1000. The actuator may be any of the actuators 100, 200, 300 or 400. The rod of the actuators 100, 200, 300, 400 may be attached to landing gear doors of the aircraft, for example, to effect movement of the doors to allow the landing gear to deploy from and be stowed within the doors.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

As an alternative to a double acting actuator, the actuator may be a single acting actuator with only one port and port passage. Such a single acting actuator may be provided with a spring (or similar) to return the piston to a default position may use gravity to do so).

The actuator may comprise a piston with a rod attached to either side of the piston, each rod extending out of opposite ends of the actuator body.

The control unit 140, 340 may be connected to the rod 119, 3109, instead of the piston 118, 318. The control unit 140, 340 may be provided (through electrical piston line 143, 343 or electrical rod line) with a signal that indicates the speed of the piston 118, 318 additionally or as an alternative to the position indication.

There may be more than one inducer coil 250, 450 provided around the actuator body 210, 410. For example, there may be an inducer coil towards the left hand end 211, 411 and/or an inducer coil towards the right hand end 212, 412. These inducer coils could be used to induce electricity and therefore damp movement of the piston 218, 418 as it approaches the relevant end of the actuator body 210, 410.

The coils mentioned above (e.g. first electrical coil, second electrical coil, inducer coil, other electrical coils) may have any suitable number of windings on them. There may be more than one coil in each coil location (or spread out) and those coils may have a different number of windings.

The number or density of windings on inducer coil(s) may chosen to provide a different amount of induced electricity depending on where the piston is. For example, very near the ends of travel, the windings may be more dense to induce greater electricity to stop the piston quickly.

There may be any number of electrical components (e.g. resistors) in the electrical lines. For example, a resistor on lines 251, 252 or 453 would enable a correct proportion of the electrical current induced to be supplied to the electrical coils 220, 230, 451 not shown.

There may be more than one chamber 350, 450 adjacent to the rod 319, 419.

The chamber (or chambers) may be located at any position along the rod. As an alternative, the chamber may be located adjacent a mechanism to be moved by the rod/actuator.

As an alternative to having a magnet on piston 218 or 418, the piston may include the inducer coil 250, 450 and a magnet may be provided around the actuator body 210, 410.

The piston/rod may be stationary and the actuator body (and chamber) may move instead (or as well). What is important is that there is some relative movement of the piston/rod and the actuator body.

The actuator may be used for landing gear doors but may also be applied to any other landing gear actuation or any other aircraft assembly or even in a non-aircraft application.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An actuator comprising:
   an actuator body,
   a piston relatively moveable within the actuator body, and
   a rod attached to the piston and extending out of a first end of the actuator body, the actuator body comprising a first port passage and a second port passage for conveying actuator fluid to or from the actuator body to effect relative movement of the piston and rod with respect to the actuator body, wherein the actuator also has:
a damping control portion provided with damping control fluid containing magnetic particles, wherein the piston or the rod is adjacent the damping control fluid, and
a first electrical coil disposed around the first port passage, a second electrical coil disposed around the second port passages, wherein the first and the second electrical coils are disposed on an exterior of the actuator body and associated with the damping control portion, such that an electrical current supplied to the first or second electrical coils induces a magnetic field over the damping control fluid and causes the effective viscosity of the damping control fluid to increase, thus increasing the damping effect of the damping control fluid on the piston or rod, wherein the piston or rod is provided with a magnet and an inducer coil is provided around the actuator body, such that relative movement of the piston or rod within the actuator body induces an electrical current in the inducer coil, wherein the induced electrical current is supplied to the first electrical coil.

2. An actuator as claimed in claim 1, wherein the actuator also has a controller unit for controlling the electrical current supplied to the first electrical coil.

3. An actuator as claimed in claim 2, wherein the controller unit is provided with an input related to the relative position and/or speed of the piston within the actuator body.

4. An aircraft assembly, comprising the actuator of claim 1 configured to operate the aircraft assembly, wherein the aircraft assembly is a landing gear assembly.

5. An aircraft, comprising: an aircraft component, wherein the actuator of claim 1 is configured to operate the aircraft component.

6. A method of operating the actuator as claimed in claim 1, wherein the method comprises the steps of:
conveying actuator fluid to or from the actuator body to effect relative movement of the piston and rod, and
damping such movement by supplying an electrical current to the first electrical coil.

7. A method of operating the actuator as claimed in claim 6, further comprising supplying electrical current to the first electrical coil is based on a current induced in an inducer coil, the current induced in the inducer coil being related to the position and/or speed of relative movement of the piston or rod.

8. A method of operating the actuator as claimed in claim 6, wherein the actuator is part of an aircraft or aircraft assembly, comprising operating the aircraft assembly using the actuator.

* * * * *